United States Patent
Diaconu et al.

(10) Patent No.: US 10,949,412 B2
(45) Date of Patent: Mar. 16, 2021

(54) LOG MARKING DEPENDENT ON LOG SUB-PORTION

(71) Applicant: Microsoft Technology Licensing, LLC, Redmond, WA (US)

(72) Inventors: Cristian Diaconu, Kirkland, WA (US); Naveen Prakash, Sammamish, WA (US); Alexander Budovski, Snohomish, WA (US); Alejandro Hernandez Saenz, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 260 days.

(21) Appl. No.: 16/138,057

(22) Filed: Sep. 21, 2018

(65) Prior Publication Data
US 2020/0097576 A1    Mar. 26, 2020

(51) Int. Cl.
*G06F 16/22* (2019.01)
*G06F 16/23* (2019.01)
*G06F 16/11* (2019.01)
*G06F 11/14* (2006.01)

(52) U.S. Cl.
CPC ...... *G06F 16/2291* (2019.01); *G06F 11/1471* (2013.01); *G06F 16/128* (2019.01); *G06F 16/2308* (2019.01); *G06F 16/2358* (2019.01)

(58) Field of Classification Search
None
See application file for complete search history.

(56) References Cited

U.S. PATENT DOCUMENTS

| 5,829,005 A | 10/1998 | Senator |
| 5,966,708 A | 10/1999 | Clark et al. |
| 9,542,396 B1 | 1/2017 | Pawar et al. |
| 9,747,174 B2 | 8/2017 | Fitzgerald et al. |
| 2005/0038792 A1 | 2/2005 | Johnson |
| 2013/0117236 A1 | 5/2013 | Schreter |

(Continued)

FOREIGN PATENT DOCUMENTS

| EP | 0465019 A2 | 1/1992 |
| WO | 2016099902 A2 | 6/2016 |

OTHER PUBLICATIONS

Davis: Tony Davis and Gail Shaw, "SQL Server Transaction Log Management", Oct. 2012, accessible from <https://www.red-gate.com/simple-talk/books/sql-books/sql-server-transaction-log-management-by-tony-davis-and-gail-shaw/> (Year: 2012).*

(Continued)

*Primary Examiner* — Aleksandr Kerzhner
*Assistant Examiner* — Anugeetha Kunjithapatham
(74) *Attorney, Agent, or Firm* — Workman Nydegger

(57) ABSTRACT

The use of log marking (otherwise known as "coloring") of sub-portions of a log that records actions (e.g., data operations) performed by a computing system. The log is composed of multiple sub-portions, such as virtual log files, which are successively added to the log as the log grows. For instance, the sub-portions may be virtual log files of the log. The principles described herein change the use of log marking depending on which sub-portion of the log is being marked. If the computing system fails, and recovery is needed, the recovery process can thus deterministically identify where the last written log record is.

10 Claims, 9 Drawing Sheets

(56) References Cited

U.S. PATENT DOCUMENTS

2016/0203052 A1     7/2016   Starks et al.
2017/0168904 A1*   6/2017   Fitzgerald ........... G06F 11/1471
2017/0351584 A1   12/2017   Griffith et al.

OTHER PUBLICATIONS

RandalBlog: Paul Randal, "Search Engine Q&A #24: Why can't the transaction log use instant initialization?; Inside the Storage Engine: More on the circular nature of the log; Initial VLF sequence numbers . . . ", 2008-2011, accessible from <https://www.sqlskills.com/blogs/paul/category/transaction-log/> (Year: 2008).*

"Managing the Redo Log", Retrieved from: https://docs.oracle.com/en/database/oracle/oracle-database/18/admin/managing-the-redo-log.html#GUID-BC1F1762-0BB1-4218-B7AF-6160C395AAE4, Jun. 28, 2018, 21 Pages.

"International Search Report and Written Opinion Issued in PCT Application No. PCT/US19/039091", dated May 27, 2020, 10 Pages. (MS#404938-WO-PCT).

Randal, Paul S. , "SQL Server", Retrieved from: https://technet.microsoft.com/en-us/library/2009.02.logging.aspx, Feb. 2009, 11 Pages.

Sridharan et al., "Provisional Application as Filed in U.S. Appl. No. 62/469,413", filed Mar. 9, 2017, 46 Pages.

* cited by examiner

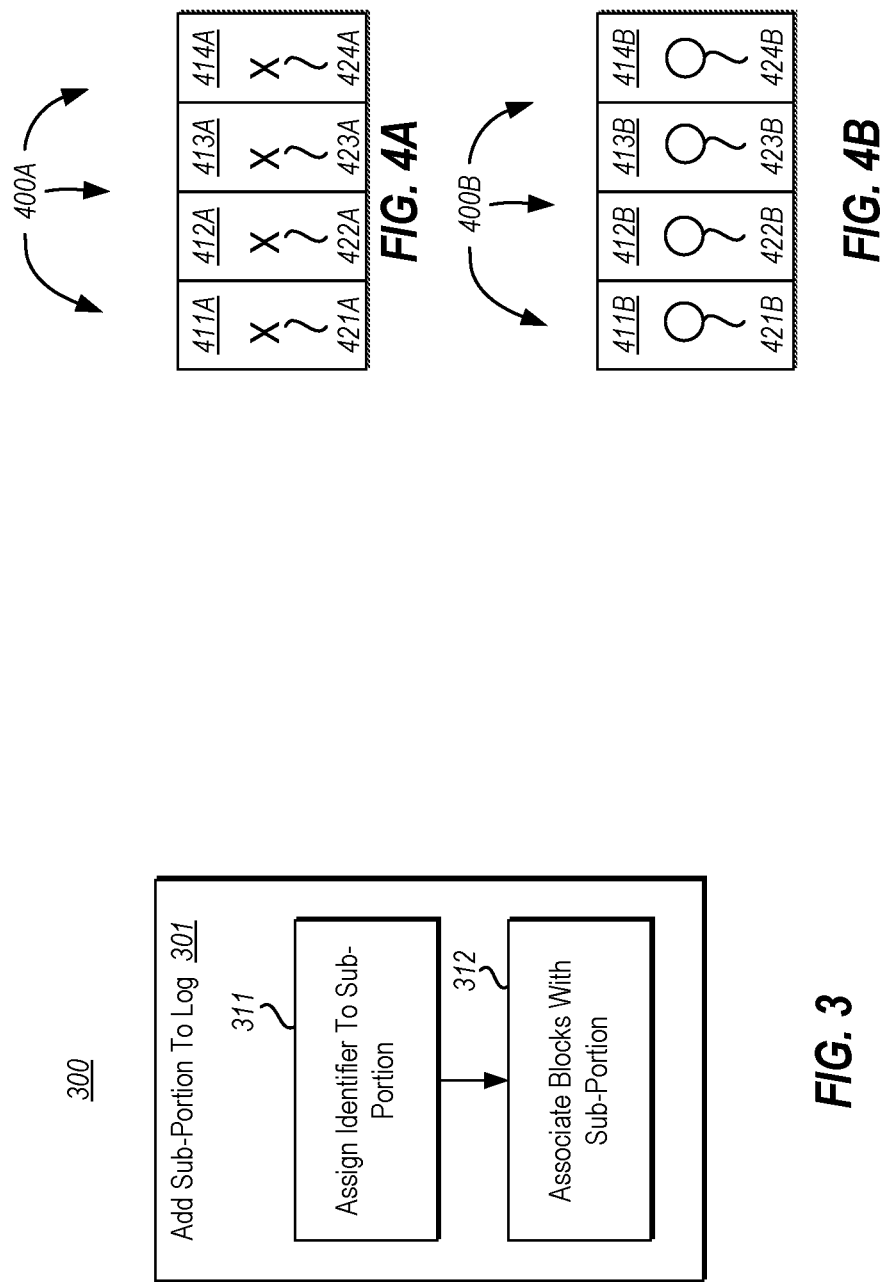

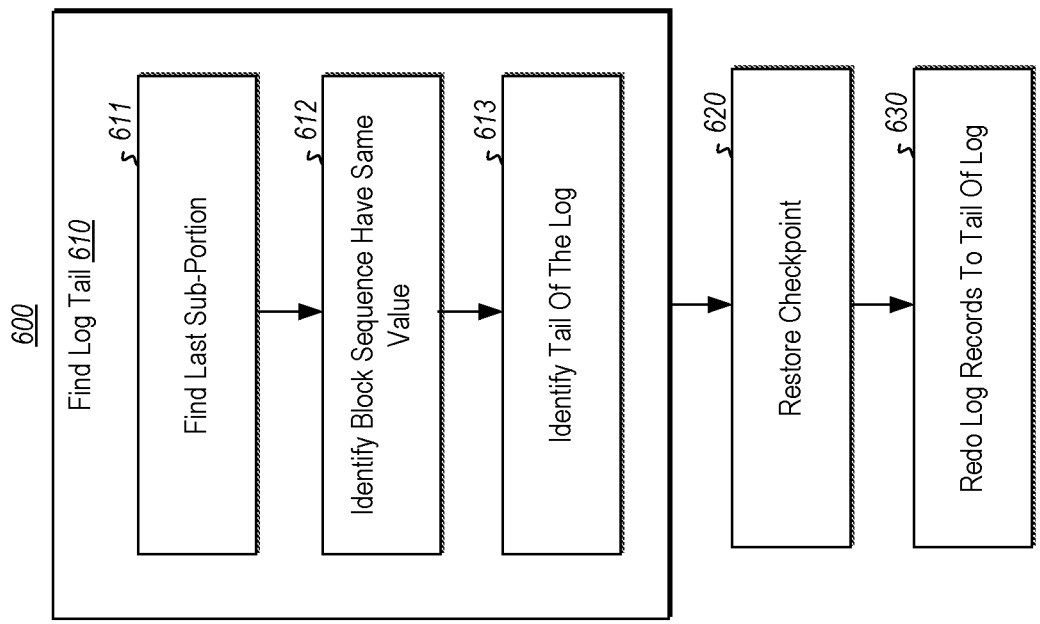
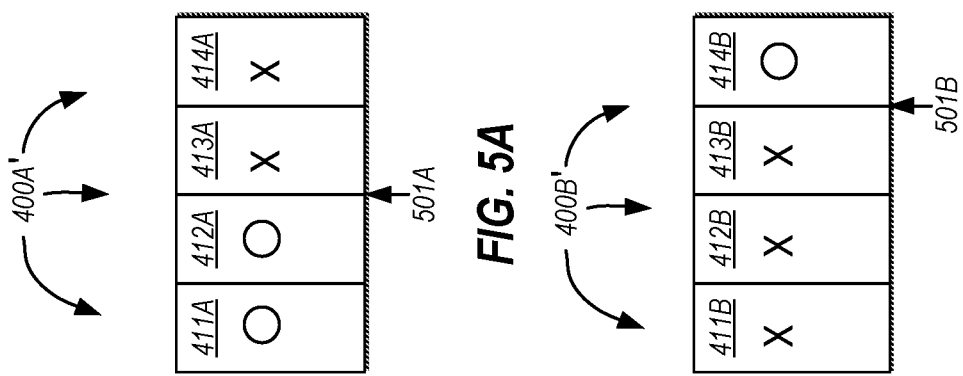

# US 10,949,412 B2

LOG MARKING DEPENDENT ON LOG SUB-PORTION

BACKGROUND

Computing systems and associated networks have revolutionized the way human beings work, play, and communicate. Nearly every aspect of our lives is affected in some way by computing systems. The proliferation of networks has allowed computing systems to share data and communicate, vastly increasing information access. For this reason, the present age is often referred to as the "information age". Data systems, such as databases, play a particularly important role in storing, organizing, filtering, and querying against large amounts of data. Often, tasks performed on a computing system are logged. For instance, the data operations (reads, writes, checkpoints, transaction commits and aborts, and so forth) of a database system are typically logged, with each data operation having a log record.

When computing systems write to or read from a persisted store, they do so atomically at the block-level. That is, a block is either written, or not written. A typical block size for a computing system is 512 bytes or more recently 4096 bytes. When writing a block to a persisted log, the block often has multiple log records contained therein since a log record is typically much smaller than the size of a block. To distinguish the position of each log record within the block, the block is subdivided even further into slots, where each log record occupies a slot within the block. At a larger level, the log also typically includes multiple sub-portions that each include a large number of blocks. An example of such a sub-portion is a virtual log file.

Because data operations occur over a long period of time, virtual log files are added to the log as needed to accommodate further log records. Each log record is uniquely identified within that log typically using a log sequence number. A log sequence number for a log record that occupies a particular slot of a particular block of a particular virtual log file is often composed of a concatenation of the respective virtual log file identifier, the respective block identifier, and the respective slot identifier.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to the use of log marking (otherwise known as "coloring") of sub-portions of a log that records actions (e.g., data operations) performed by a computing system. The log is composed of multiple sub-portions, which are successively added to the log as the log grows. For instance, the sub-portions may be virtual log files of the log.

The principles described herein change the use of log marking depending on which sub-portion of the log is being marked. If the computing system fails, and recovery is needed, the recovery process can thus deterministically identify where the last written log record is. This may be a particular difficult task if the storage space of a virtual log file is reused by a subsequent virtual log file without erasing the prior virtual log file. In that case, it may be quite difficult to tell which block was written to as part of the current virtual log file, and which block holds stale data from a prior virtual log file. During recovery, the computing system may restore the last checkpoint, and then redo all of the subsequent actions specified within the log up to the last log record in the log.

In accordance with the principles described herein, when adding a sub-portion to the log, an identifier is assigned to that sub-portion, and the blocks within that sub-portion are associated with that sub-portion. When writing to each of the blocks, a value of log marker data is assigned to that block, the value depending on the corresponding sub-portion identifier. As example only, if the identifier of a virtual log file is odd, then the blocks may be assigned log marker data having one of two values (e.g., binary 01). In this example, if the identifier of a virtual log file is even, then the blocks may be assigned log marker data having the other of the two values (e.g., binary 10).

This particular example has the further benefit of making the search for the tail of the log particularly elegant when log sub-portions having an identifier of one parity (e.g., odd or even) are replaced by log sub-portions having an identifier of the opposite parity. In that case, a tail of the log is found by beginning at a last sub-portion, and finding a successive sequence of blocks in which the value of the log marker data is the same. The tail of the log is at or just after the last block of the successive sequence of blocks. In other words, the tail of the log may be found by scanning through the blocks in the last sub-portion and simply finding where the value of the log marker data changes.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Therefore, these drawings depict only example embodiments of the invention and are not therefore to be considered to be limiting of the scope of the invention. With this in mind, example embodiments of the invention will be described and explained with reference to the accompanying drawings in which:

FIG. 3 illustrates a flowchart of a method for adding sub-portions to a log composed of multiple sub-portions in accordance with the principles described herein;

FIG. 4A shows a sub-portion that for purposes of simplicity includes only four blocks, and in which each block has stale log marker data having a first value X;

FIG. 4B shows a sub-portion, in which each block has stale log marker data having a second value O;

FIG. 5A shows the sub-portion of FIG. 4A after two blocks having been written, thereby writing log marker data of value X;

FIG. 5B shows the sub-portion of FIG. 4B after three blocks having been written, thereby writing log marker data of value O;

FIG. 6 illustrates a flowchart of a method for recovering a computing system in accordance with principles described herein;

DETAILED DESCRIPTION

At least some embodiments described herein relate to the use of log marking (otherwise known as "coloring") of sub-portions of a log that records actions (e.g., data operations) performed by a computing system. The log is composed of multiple sub-portions, which are successively added to the log as the log grows. For instance, the sub-portions may be virtual log files of the log.

The principles described herein change the use of log marking depending on which sub-portion of the log is being marked. If the computing system fails, and recovery is needed, the recovery process can thus deterministically identify where the last written log record is. This may be a particular difficult task if the storage space of a virtual log file is reused by a subsequent virtual log file without erasing the prior virtual log file. In that case, it may be quite difficult to tell which block was written to as part of the current virtual log file, and which block holds stale data from a prior virtual log file. During recovery, the computing system may restore the last checkpoint, and then redo all of the subsequent actions specified within the log up to the last log record in the log.

In accordance with the principles described herein, when adding a sub-portion to the log, an identifier is assigned to that sub-portion, and the blocks within that sub-portion are associated with that sub-portion. When writing to each of the blocks, a value of log marker data is assigned to that block, the value depending on the corresponding sub-portion identifier. As example only, if the identifier of a virtual log file is odd, then the blocks may be assigned log marker data having one of two values (e.g., binary 01). In this example, if the identifier of a virtual log file is even, then the blocks may be assigned log marker data having the other of the two values (e.g., binary 10).

This particular example has the further benefit of making the search for the tail of the log particularly elegant when log sub-portions having an identifier of one parity (e.g., odd or even) are replaced by log sub-portions having an identifier of the opposite parity. In that case, a tail of the log is found by beginning at a last sub-portion, and finding a successive sequence of blocks in which the value of the log marker data is the same. The tail of the log is at or just after the last block of the successive sequence of blocks. In other words, the tail of the log may be found by scanning through the blocks in the last sub-portion and simply finding where the value of the log marker data changes.

Figure 1A:
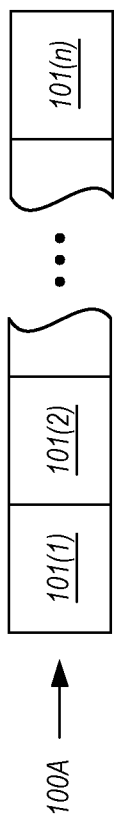
FIG. 1A illustrates a growable log that has "n" sub-portions, where "n" may be any positive integer.
Figure 1B:
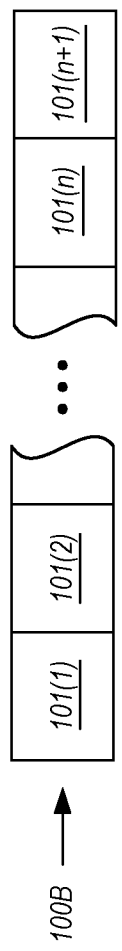
FIG. 1B illustrates the growable log of FIG. 1A after an n+1th sub-portion is added to the growable log.

FIG. 1A illustrates a growable log 100A. The growable log 101A has multiple sub-portions 101(1) through 101(n), where "n" may be any positive integer. For purposes of the figures, suppose that the log is filled from left to right such that the oldest log records are within the sub-portion 101(1), and the newest log records are within sub-portion 101(n). When the growable log 100A is almost full, an additional sub-portion is added to the growable log 100A. For instance, as seen in FIG. 1B, the growable log 100B is now augmented by the sub-portion 101(n+1). As an example, the sub-portions may each be a distinct virtual log file.

Figure 2:
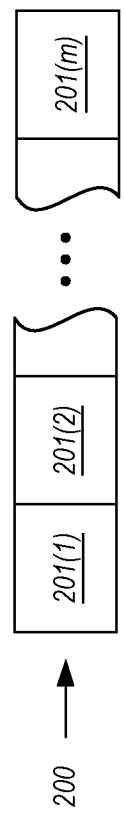
FIG. 2 illustrates a log sub-portion in further detail, which includes "m" blocks, where "m" may be any positive integer.

FIG. 2 illustrates a log sub-portion 200 in further detail. The log sub-portion 200 may be, for instance, the log sub-portion 101(n) of FIG. 1A or FIG. 1B. The log sub-portion 200 includes a fixed number of blocks. A block is a unit of storage that may be written to and read from atomically (i.e., at one time—such that the write or read is either completed for the entire block, or not done at all). A typical block size will be constant in a computing system, but example block sizes include 512 or 4096 bytes. The sub-portion 200 is illustrated as including "m" blocks 201(1) through 201(m), where "m" is any plural integer two or more. Typically, the number "m" of blocks within a virtual log file will be quite large. The number of blocks "m" within each of the "n" sub-portions 101(1) through 101(n) of the growable log may be the same, such that each of the sub-portions are of equal size.

Again, when writing to a particular sub-portion, each block of that sub-portion may be written one at a time beginning from the first block 201(1) and continuing through to the last block 201(m). When a log record is persisted into the log, a block that includes that log record (and likely other log records as well) is written into the fixed-sized log file. Each log record within the block occurs a slot within the block. A log sequence number may thus be composed of a concatenation of a sub-portion identifier, a block identifier, and a slot identifier. The block can be identified from the log sequence number allowing the proper block to be read. Then, the slot identifier may be used to extract the proper log record from that block.

FIG. 3 illustrates a flowchart of a method 300 for adding sub-portions to a log composed of multiple sub-portions in accordance with the principles described herein. Here, the method includes adding a sub-portion to a log (act 301). As part of this addition act (act 301), an identifier is assigned to the sub-portion (act 311), and each of the blocks of the corresponding sub-portion is associated with the corresponding subportion (act 312). When writing to each block, the value of log marker data is assigned to the block, where the value depends on the corresponding sub-portion identifier.

For instance, FIG. 4A shows a sub-portion 400A that for purposes of simplicity includes only four blocks 411A, 412A, 413A and 414A. This block has stale log marker data symbolically represented by four X's 421A, 422A, 423A and 424A. FIG. 4B shows a similar sub-portion 400B that also includes only four blocks 411B, 412B, 413B and 414B. However, here, the stale log marker data has a different value as represented by the four O's 421B, 422B, 423B and 424B. Here, the value of the stale log marker data is a function of the current sub-portion identifier. Thus, in this example, the values of the stale log marker data within each block of sub-portion 400A has one value, while the values of the stale log marker data within each block of different sub-portion 400B has a different value.

When writing to each of the blocks of a sub-portion of the log, the initial value of the log marker data is written to a value that also depends on the identifier of the corresponding sub-portion. For instance, FIG. 5A illustrates a subsequent state 400A' of the sub-portion of FIG. 4A. The values of the log marker data within the blocks 411A and 412A have been overwritten by value O. This indicates that blocks 411A and 412A having been written to in the sub-portion (but blocks 413A and 414A have not been written to yet). FIG. 5B illustrates a subsequent state 400B' of the sub-portion of FIG. 4B. The values of the log marker data within the blocks 411B, 412B and 413B have been overwritten by value X. This indicates that blocks 411B, 412B and 413B have been written to in the sub-portion (but block 414B has not been written to yet).

Thus, for sub-portion 400A, value X of the log marker data indicates that the block has not yet been written to, and value O of the log marker data indicates that the block has been written to. Also, because the identifier of the sub-portion 400B is different that the identifier of sub-portion 400A, value O of the log marker data indicates that the block has not yet been written to, and value X of the log marker data indicates that the block has been written to.

If a failure of the computing system occurs after writing to some of the blocks of a particular sub-portion, but before writing to other of the plurality of blocks of the particular sub-portion, the recovery process identifies that the tail of the log is within the particular sub-portion and just before the other of the plurality of blocks in the particular sub-portion. Thus, in the case of FIG. 5A, the tail of the log would be determined to be at point 501A, or in other words, log record 412A is the last record that was written to the log. Alternatively, in the case of FIG. 5B, the tail of the log would be determined to be at point 501B, or in other words, log record 413B is the last record that was written to the log.

In one embodiment, sub-portions are added to the log with identifiers alternating between even and odd identifiers. Thus, if an identifier of a prior sub-portion (e.g., sub-portion 101(1)) is odd, an identifier of a subsequent sub-portion (e.g., sub-portion 101(2)) is even, and such that if an identifier of a prior sub-portion is even, an identifier of a subsequent sub-portion is odd. One way to do this is to increment sub-portion identifiers by one for each successive sub-portion added to the log. In this case, sub-portions having an odd identifier are written with a first of two values (e.g., binary 01). Sub-portions having an even identifier are written with log marker data having a second of two values (e.g., binary 10).

FIG. 6 illustrates a flowchart of a method 600 for recovering a computing system in accordance with principles described herein. The method 600 includes finding a tail of the log (act 610). The tail of the log may be found by finding the last sub-portion of the log (act 611), and identifying a sequence of blocks within the last sub-portion in which log marker data for the sequence of blocks remains a same value (act 612). The next block after the sequence of blocks has a different value than the log marker data within the sequence of blocks. The recovery identifies the tail of the log as being at or just after the sequence of blocks (act 613). The recover restores the last checkpoint (act 620), and redoes the log records up to this identified tail of the log (act 630).

As will be apparent from above, the ability to find the tail of the log works of the stale log marker data is different than new log marker data that is written to blocks of the current log. One way to do this is to reuse storage space of older sub-portions with new sub-portions, in a way that the marker data for the prior sub-portion is different than the marker data written to blocks of the new sub-portion. A more specific example of how this may be done is described with respect to FIG. 7 and FIGS. 8A through 8D, in which the principles described herein are applied to a bifurcated log.

Figure 7:
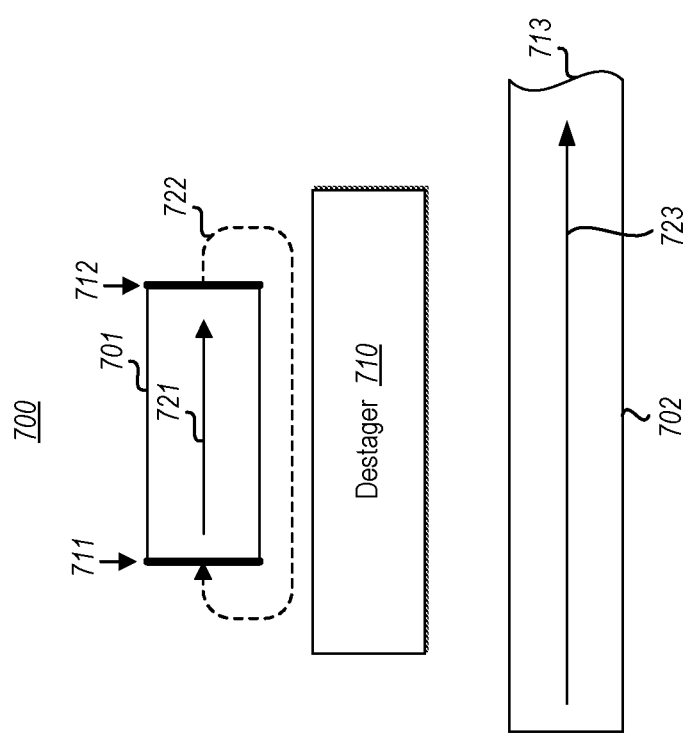
FIG. 7 illustrates a log environment in which the log is composed of two components—a fixed-sized log portion and a growable log portion.

FIG. 7 illustrates a log environment 700 in which there is a log that is composed of two components—a fixed-sized log portion 701 and a growable log portion 702. The fixed-sized log portion 701 is fixed in size as symbolically represented by the boundaries 711 and 712 being thicker. The fixed-sized log portion 701 includes the more recent log records recorded in the log (and includes the tail of the log). As will become apparent further below, an advantage of the fixed-sized log portion 701 being fixed in size is that readers of the fixed-sized log portion 701 are able to deterministically know where a log record is located within the fixed-sized log portion 701 using only the log sequence number of that log record. Furthermore, the fixed-size log portion is in a format that is designed to be safely shared between readers and writers. This simplifies the process of enabling readers to read log records from the log.

The fixed-sized log portion 701 is sequentially written to as represented by the arrow 721. When the end (e.g., end 712) of the fixed-sized log portion 701 is encountered, the writing wraps back (as represented by dashed-lined arrow 722) to the beginning (e.g., beginning 711) of the fixed-sized log portion 701 to continue writing to the log. Thus, the writing to the fixed-sized log portion 701 occurs in circular fashion. Because of the circular write pattern, older log records will be overwritten by newer log records. Prior to that happening, a destager component 710 writes those older log records sequentially onto the end (e.g., end 713) of the growable log portion 702. In this manner, the growable log portion 702 grows sequentially in direction 723.

Thus, the fixed-sized log portion 701 includes newer log records, which are the log records that are most often read. On the other hand, the growable log portion 702 includes older log records that are less often read. Furthermore, the fixed-sized log portion 701 will include the tail of the log, which is the last log record written to the log as a whole. In case of failure, it is important to be able to identify the tail of the log since that log record is the last log record that the log service has guaranteed will be executed even if there is a failure that occurs prior to the data operation represented by the log record having been completed. During recovery, the recovery process restores the last checkpoint, and redoes the data operations of each log record one at a time until the tail of the log is encountered.

Figure 8A:
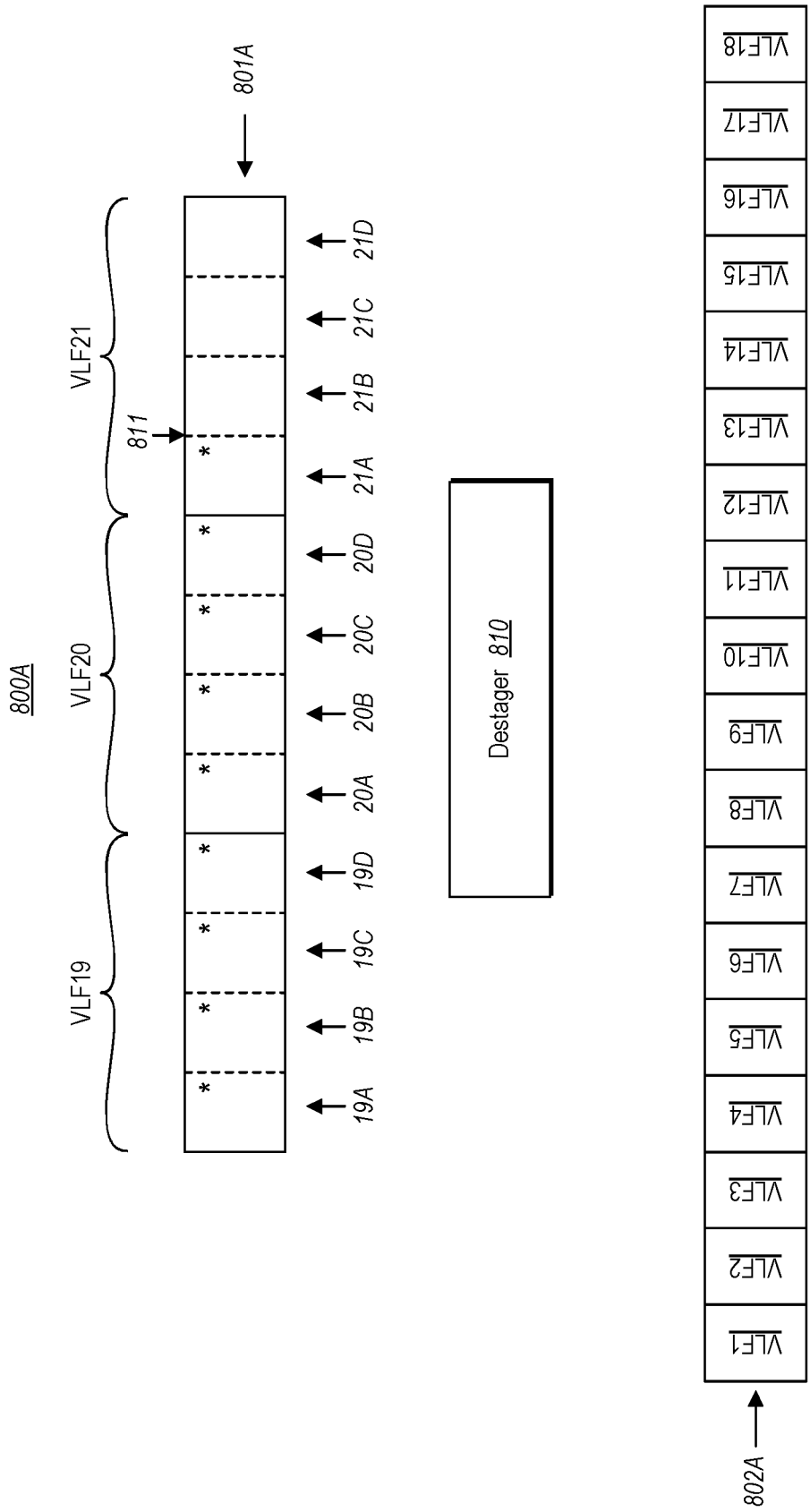
FIG. 8A illustrates a log environment that represents a specific example of the log environment of FIG. 7, and in which the fixed-sized log portion includes three virtual log files (each having four blocks), and in which the growable log portion has therein eighteen virtual log files.

FIG. 8A illustrates a log environment 800A that represents a specific example of the log environment 700 of FIG. 7. The fixed-size log portion 801A of FIG. 8A represents an example of the fixed-size log portion 701 of FIG. 7. The growable log portion 802A of FIG. 8A represents an example of the growable log portion 702 of FIG. 7. In this example, and in one embodiment, the fixed-size log portion 801A is sized to include an odd number of sub-portions. For instance, a sub-portion may be a virtual log file. As will become apparent from the description below, an advantage of the log portion 801A being sized to include an odd number of virtual log files is that the normal operation of initializing sub-portions is simplified, while still allowing recovery processes to find the tail of the log. In this specific example, the fixed-size log portion 801A is sized to include three virtual log files.

Suppose that thus far, the log is composed of 21 virtual log files (or "VLFs"), and that virtual log files are identified in sequential order as VLF1, VLF2, VLF3, and so forth. The fixed-size log portion 801A would include the last three virtual log files VLF19, VLF20, and VLF21. The older virtual log files VLF1 through VLF18 would have been previously destaged into the growable log portion 801A by the destager 810.

In this example, and as most apparent from the fixed-size log portion 801A, each portion (e.g., virtual log file) includes a fixed number of blocks. While a virtual log file may typically have a very large number of blocks, to keep the example simple, each virtual log file (e.g., VLF19 to VLF21) is illustrated as having four (4) blocks. For instance, virtual log file VLF19 is sequentially composed of blocks 19A to 19D, virtual log file VLF20 is sequentially composed of blocks 20A to 20D, and virtual log file VLF21 is sequentially composed of blocks 21A to 21D.

When a log record is written into the persistent log, a block that includes that log record is written into the fixed-size log file. Each log record within the block occurs a slot within the block. A log sequence number may thus be composed of a concatenation of a virtual log file identifier, a block identifier, and a slot identifier. Note that with the knowledge that the fixed-size log portion 801A has within it VLF19, VLF20 and VLF21 sequentially arranged in that order, any reader can get any log record within any of those virtual files with just the log sequence number. The block can be identified from the log sequence number allowing the proper block to be read. Then, the slot identifier from the log sequence number may be used to extract the proper log record from that block.

In any case, blocks are written by the primary compute system 110 one block at a time sequentially to the fixed-size log file. In the example of FIG. 8A, a block is represented as written to when it has an asterisk in the upper right corner. Thus, at the point in time illustrated in FIG. 8A, the tail of the log (represented by pointer 811) is just after the block 21A since block 21A is the last block written.

The destager 810 monitors the position of the tail of the log (i.e., the position of the most recent block written to) in the fixed-size log portion 801A, and ensures that any virtual log files that are about to be overwritten are destaged into the growable log portion 802A. Then, storage locations of the fixed-size log portion 801A that were used to store that newly-destaged virtual log file may be reused for a subsequent virtual log file.

Figure 8B:
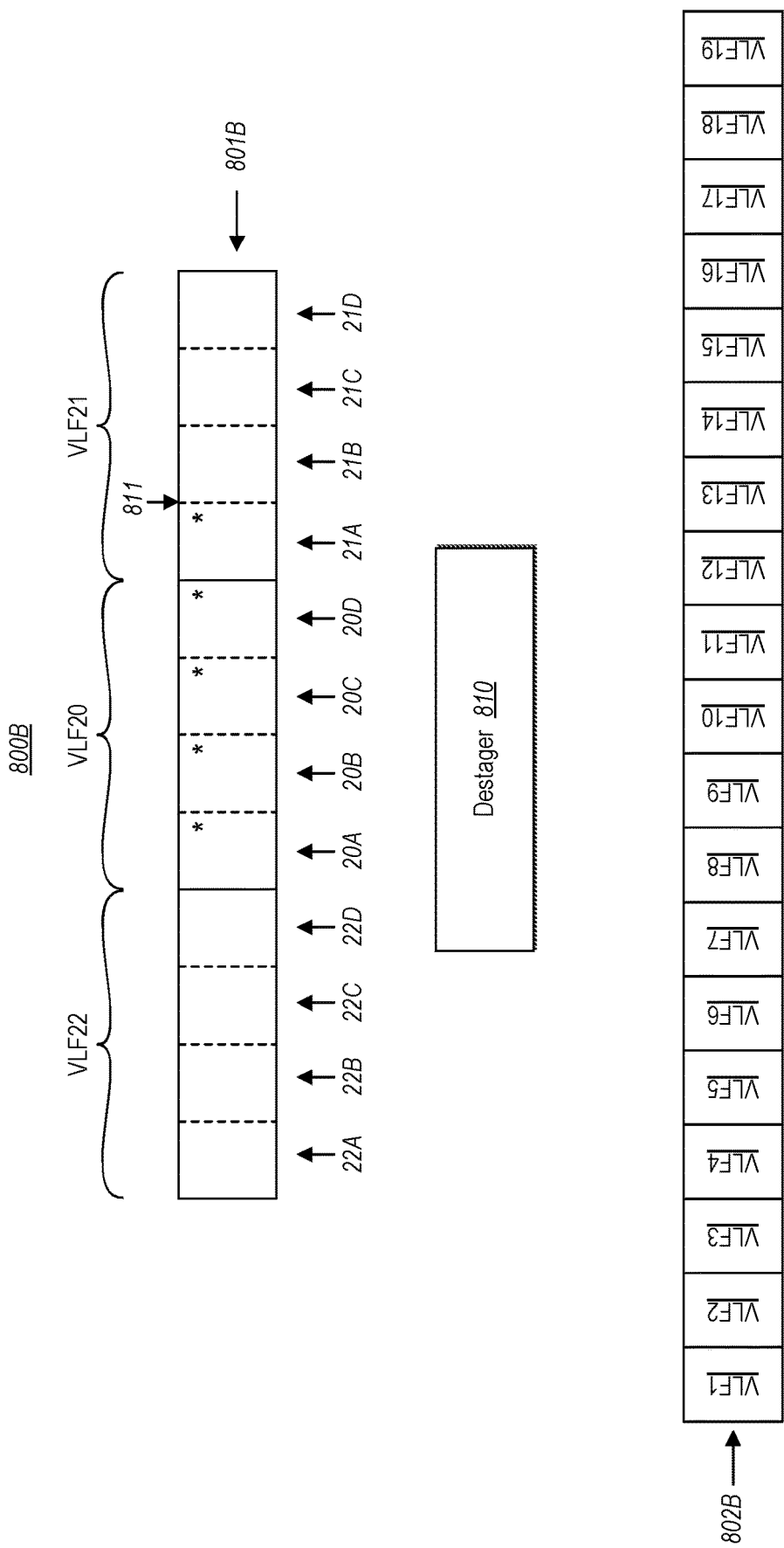
FIG. 8B illustrates a log environment that represents a subsequent state of the log environment of FIG. 8A after virtual log file VLF19 has been destaged, and the storage locations of the fixed-sized log file are reused by a subsequent virtual log file VLF22.

FIG. 8B illustrates a log environment 800B that represents a subsequent state of the log environment 800B after virtual log file VLF19 has been destaged, and the storage locations of the fixed-size log file 801A (now called labelled 801B) reused by a subsequent virtual log file VLF22 having blocks 22A, 22B, 22C and 22D. In this example, the sub-portion identifier (e.g., the virtual log file identifier) for each successively initialized sub-portion (e.g., a virtual log file) is incremented each time a new sub-portion (e.g., a virtual log file) is initialized within the fixed-size log portion. Note also that the growable log portion 802B has now grown by one virtual log file to now include virtual log file VLF19. In this example, the tail of the log 811 in FIG. 8B has not moved compared to the tail of the log in FIG. 8A. That is, the tail of the log 811 is still just after block 21A.

Now suppose that a checkpoint is taken at this point (right after block 21A is written to the fixed-size log portion 801B). Then, consistent with the sequential and circular writing pattern, suppose that the following blocks are then written to in sequence into the fixed-size log portion 801B: block 21B, block 21C, block 21D, block 22A, and block 22B. The result will be the log environment 800C of FIG. 8C. Note now that the fixed-size log portion 801C has up to block 22B shown with an asterisk, and thus the tail of the log 811 is now just after block 22B. Furthermore, for convenience, the snapshot pointer 812 is represented for the convenience of the reader and will be referenced further below.

Figure 8C:
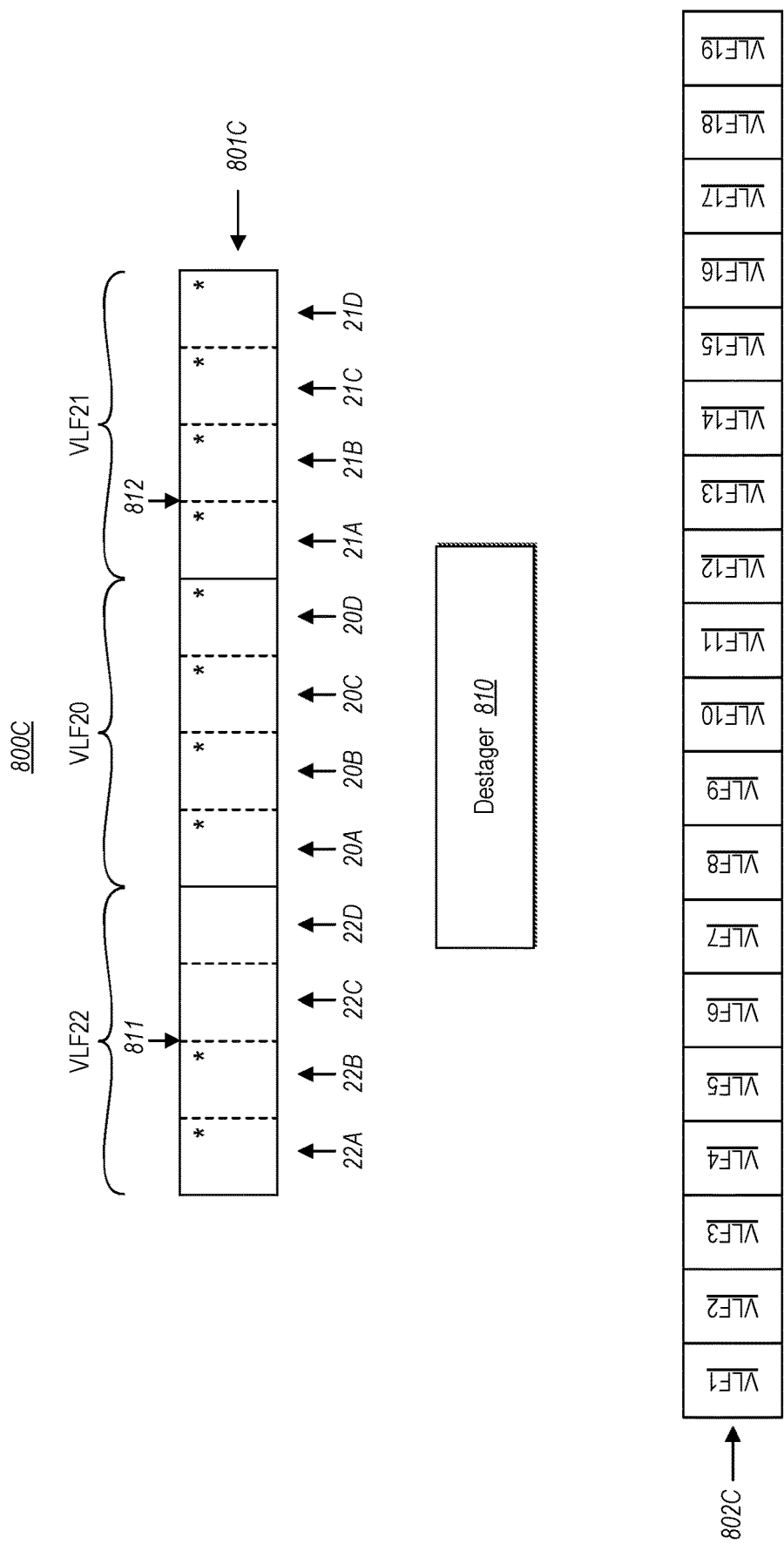
FIG. 8C illustrates a log environment that represents a subsequent state of the log environment of FIG. 8B after a checkpoint is taken at this point and after blocks are further written up to, and including, block 22B.

Now suppose that a failure occurs when the tail of the log 811 is just after block 22B (as shown in FIG. 8C). The task during recovery would be to first restore the most recent snapshot. In FIG. 8C, that would bring the state of the data up to just after the data operation for all of the log records within block 21A are executed. But to bring the data fully current, the recovery process executes all subsequent data operations represented by subsequent log records until the tail of the log (at point 811) is encountered. The problem though is identifying when the tail of the log is encountered. After all, the blocks 22C and 22D still have data in them, though it is the log records that were destaged as part of blocks 19C and 19D. Thus, it is important to recognize what blocks have been written to as part of the current virtual log file (VLF22), and distinguish those blocks from those blocks that have stale data from a prior circular write cycle.

In order to allow the recovery process to make this distinction, there is a new marker data within each block that, together with the current virtual log file identifier, allows the recovery process to deterministically conclude whether or not new data has been written to the block as part of the current virtual log file. In one embodiment, the new marker data may be two bits within a block. The value of these bits, in conjunction with the sub-portion identifier, allows the recover process to determine which blocks have been written to.

For instance, suppose that when writing to blocks of sub-portions having odd sub-portion identifiers (e.g. VLF19 or VLF21), the two bits are written with a first possible value (e.g., 01). In that case, when writing to blocks of sub-portions having even sub-portion identifiers (e.g., VLF20 or VLF22), the two bits are written with the second possible value (e.g., 10).

Figure 8D:
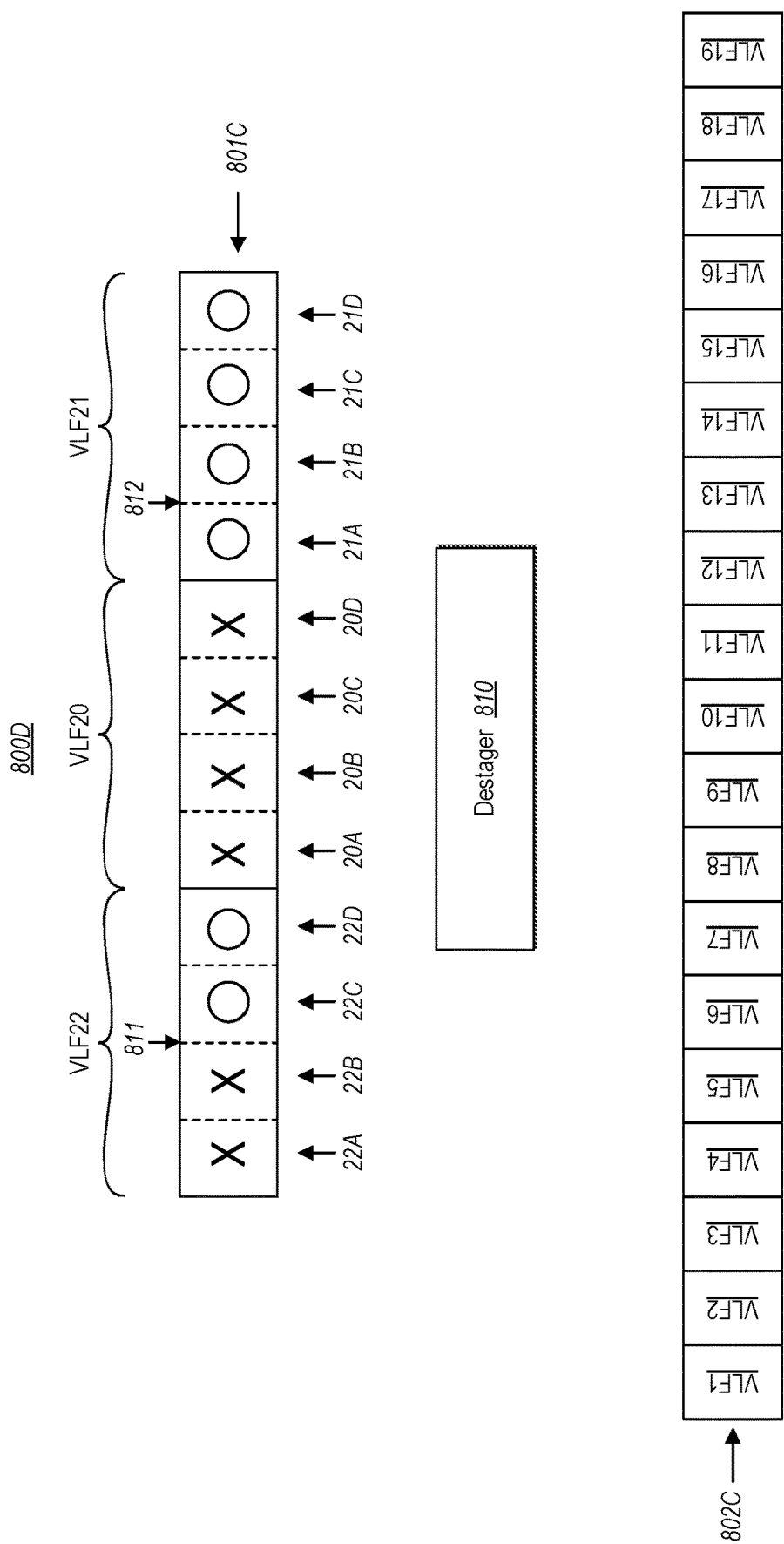
FIG. 8D illustrates the log environment of FIG. 8C, with Xs and Os inserted into the blocks to represent log marker bits that are tied to the virtual log file.

FIG. 8D is a log environment 800D that is the same as the environment 800C of FIG. 8C, except that an "O" fills those blocks that would have the bits 01 using the convention described in the previous paragraph, and that an "X" fills those blocks that would have the bits 10 using the convention described in the previous paragraph. The asterisks have been removed since they were used just for the convenience of the reader.

The sub-portion VLF20 has had all of its blocks written to (since the tail of the log is way forward in VLF22). Thus, because the sub-portion identifier VLF20 is even, the two bits would be 10, and thus the blocks 20A, 20B, 20C and 20D are shown as having an X. Of course, recovery should look for the tail of the log in the most recent sub-portion VLF22. However, even though the recovery does not need to look for the tail of the log in any of the prior sub-portions, if the recovery did examine sub-portion VLF20, the recovery would know that the tail of the log is not there.

The sub-portion VLF21 has had all of its blocks written to (since the tail of the log is way forward in VLF22). Thus, because the sub-portion identifier VLF21 is odd, the two bits would be 01, and thus the blocks 21A, 21B, 21C and 21D are shown as having an O. Thus, if the recovery did examine sub-portion VLF21, the recovery would know that the tail of the log is not there.

The sub-portion VLF22 has only some of its blocks written to since the tail of the log 811 is within the sub-portion VLF22. Specifically, because the sub-portion identifier VLF is even, the two bits of the two blocks 22A and 22B written to would be 10, and are thus shown with the "X" inside. However, note that the old data from VLF19 is still within blocks 22C and 22D. That old data was written to those blocks when the primary compute system was writing to blocks 19C and 19D as part of sub-portion VLF19. Since that data has not changed at all, the two bits of blocks 22C and 22D remain 01, and are thus marked with an "O" inside. Thus, without having to reformat the storage space that was used for sub-portion VLF19 when beginning to reuse the storage space for sub-portion VLF22, the recovery process may still find the tail of the log. This effect is achieved precisely because there are an odd number (three) of sub-portions within the fixed-size log portion, and the sub-portions are added with identifiers that alternate between even and odd (which happens when they monotonically increase by one each time).

Thus, the log written to the volume 135 may be optimized such that the more frequently accessed blocks (that include the most recent log records) are optimized so that any reader may read those blocks and access appropriate log records using only the log sequence number. Furthermore, the writes may happen during normal operation such that, in a subsequent recovery, the tail of the log may be quickly found, without having to expend effort reformatting the storage space in the fixed-size log portion. Thus, truly, the log service may acknowledge that the data operation is guaranteed to take place once the block having that log record is written into the log of the log environment 700 of FIG. 7.

Additionally, because the fixed-size log portion is fixed in size, the management data of the drive that stores the fixed-size log stays the same. Also, as described above, the fixed-size log portion is designed to be safely shared between readers and writers in that the content is self-describing. This allows readers and the writer to be safe from torn writes and other concurrent access distortions even though the readers and write need not communicate with each other. Thus, the drive can even be mounted to multiple computing systems.

Because the principles described herein operate in the context of a computing system, a computing system will be described with respect to FIG. 9. Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses, watches, bands, and so forth). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 9:
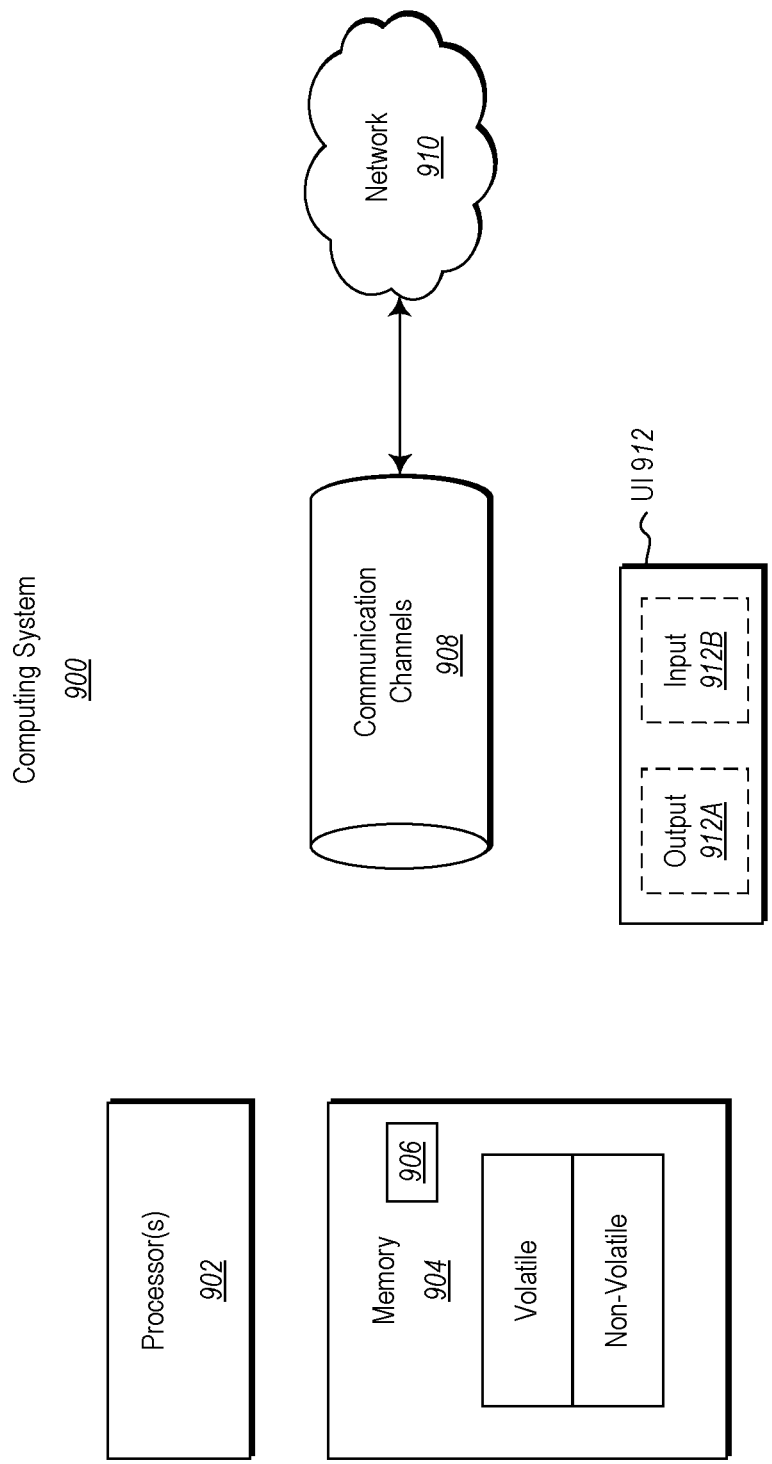
FIG. 9 illustrates an example computer system in which the principles described herein may be employed.

As illustrated in FIG. 9, in its most basic configuration, a computing system 900 typically includes at least one hardware processing unit 902 and memory 904. The memory 904 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 900 has thereon multiple structures often referred to as an "executable component". For instance, the memory 904 of the computing system 900 is illustrated as including executable component 906. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the term "component" or "vertex" may also be used. As used in this description and in the case, this term (regardless of whether the term is modified with one or more modifiers) is also intended to be synonymous with the term "executable component" or be specific types of such an "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 904 of the computing system 900. Computing system 900 may also contain communication channels 908 that allow the computing system 900 to communicate with other computing systems over, for example, network 910.

While not all computing systems require a user interface, in some embodiments, the computing system 900 includes a user interface 912 for use in interfacing with a user. The user interface 912 may include output mechanisms 912A as well as input mechanisms 912B. The principles described herein are not limited to the precise output mechanisms 912A or input mechanisms 912B as such will depend on the nature of the device. However, output mechanisms 912A might include, for instance, speakers, displays, tactile output, holograms, virtual reality, and so forth. Examples of input mechanisms 912B might include, for instance, microphones, touchscreens, holograms, virtual reality, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or components and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface component (e.g., a "NIC"), and then eventually transferred to computing system RAM and/or to less volatile storage media at a computing system. Thus, it should be understood that readable media can be included in computing system components that also (or even primarily) utilize transmission media.

Computer-executable instructions comprise, for example, instructions and data which, when executed at a processor, cause a general-purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses or watches) and the like. The invention may also be practiced in distributed system environments where local and remote computing systems, which are linked (either by hardwired data links, wireless data links, or by a combination of hardwired and wireless data links) through a network, both perform tasks. In a distributed system environment, program components may be located in both local and remote memory storage devices.

Those skilled in the art will also appreciate that the invention may be practiced in a cloud computing environment, which is supported by one or more datacenters or portions thereof. Cloud computing environments may be distributed, although this is not required. When distributed, cloud computing environments may be distributed internationally within an organization and/or have components possessed across multiple organizations.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand, self-service, broad network access, resource pooling, rapid elasticity, measured service, and so forth. A cloud computing model may also come in the form of various application service models such as, for example, Software as a service ("SaaS"), Platform as a service ("PaaS"), and Infrastructure as a service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
   one or more processors; and
   one or more computer-readable storage media having thereon computer-execution instructions that are structured such that, when executed by the one or more processors, the computing system is caused to perform a method for adding sub-portions to a log composed of multiple sub-portions, the method comprising:
   an act of adding each of a plurality of new sub-portions to the log, wherein for each of at least some of the plurality of sub-portions, the act of adding the corresponding sub-portion comprises:
      assigning a corresponding sub-portion identifier to the corresponding sub-portion, wherein sub-portions are added to the log with identifiers that alternate between even identifiers and odd identifiers;
      initializing each of a plurality of blocks of the corresponding sub-portion to be associated with the corresponding sub-portion and by at least assigning a same value of log marker data to each of the plurality of the blocks in the corresponding sub-portion, the value of the log marker data being selected from a first value of log marker data and a different value of log marker data value, the selection of the value of the log marker data depending on whether the corresponding sub-portion identifier is an even identifier or an odd identifier, and such that all adjacent sub-portions in the plurality of sub-portions have different log marker data values assigned, with the first value of log marker data being used for a first sub-portion and the different value of log marker data value being used for the subsequent and adjacent sub-portion followed by a next sub-portion being assigned the first value of log marker data; and
      when writing to each particular block of the plurality of blocks in the corresponding sub-portion, after wrapping around from an end of the log and writing to a previously written to sub-portion of the log, modifying a previously assigned value of log marker data for the particular block of the corresponding sub-portion, wherein modifying the first value comprises changing the first value of log marker data to the different value of log marker data and wherein modifying the different value of log marker data comprise changing the different value of log marker data into the first value of log marker data, the value depending on the corresponding sub-portion identifier which has changed after wrapping around from the end of the log and writing to the previously written to sub-portion.

2. The computing system in accordance with claim 1, wherein if a failure of the computing system occurs after writing to some of the plurality of blocks of a particular sub-portion of the plurality of sub-portions, but before writing to other of the plurality of blocks of the particular sub-portion of the plurality of sub-portions, a recovery process is performed that identifies that the tail of the log is within the particular sub-portion and just before the other of the plurality of blocks in the particular sub-portion.

3. The computing system in accordance with claim 1, wherein sub-portions are added to the log with identifiers that alternate between even and odd identifiers such that if an identifier of a prior sub-portion is odd, an identifier of a subsequent sub-portion is even, and such that if an identifier of a prior sub-portion is even, an identifier of a subsequent sub-portion is odd.

4. The computing system in accordance with claim 3, wherein each successive sub-portion in the plurality of sub-portions has an identifier that is incremented by one.

5. The computing system in accordance with claim 1, each of the plurality of sub-portions being a virtual log file.

6. A method for adding sub-portions to a log composed of multiple sub-portions, the method comprising:
   an act of adding each of a plurality of new sub-portions to the log, wherein for each of at least some of the plurality of sub-portions, the act of adding the corresponding sub-portion comprises:
      assigning a corresponding sub-portion identifier to the corresponding sub-portion, wherein sub-portions are added to the log with identifiers that alternate between even identifiers and odd identifiers;
      initializing each of a plurality of blocks of the corresponding sub-portion to be associated with the corresponding sub-portion and by at least assigning a same value of log marker data to each of the plurality of the blocks in the corresponding sub-portion, the value of the log marker data being selected from a first value of log marker data and a different value of log marker data value, the selection of the value of the log marker data depending on whether the corresponding sub-portion identifier is an even identifier or an odd identifier, and such that all adjacent sub-portions in the plurality of sub-portions have different log marker data values assigned, with the first value of log marker data being used for a first sub-portion and the different value of log marker data value being used for the subsequent and adjacent sub-portion followed by a next sub-portion being assigned the first value of log marker data; and
      when writing to each particular block of the plurality of blocks in the corresponding sub-portion, after wrapping around from an end of the log and writing to a previously written to sub-portion of the log, modifying a previously assigned value of log marker data for the particular block of the corresponding sub-portion, wherein modifying the first value comprises changing the first value of log marker data to the different value of log marker data and wherein modifying the different value of log marker data comprise changing the different value of log marker data into the first value of log marker data, the value depending on the corresponding sub-portion identifier which has changed after wrapping around from the end of the log and writing to the previously written to sub-portion.

7. The method in accordance with claim 6, wherein if a failure of the computing system occurs after writing to some of the plurality of blocks of a particular sub-portion of the plurality of sub-portions, but before writing to other of the plurality of blocks of the particular sub-portion of the plurality of sub-portions, a recovery process is performed identifies that the tail of the log is within the particular sub-portion and just before the other of the plurality of blocks in the particular sub-portion.

8. The method in accordance with claim 6, wherein each successive sub-portion in the plurality of sub-portions has an identifier that is incremented by one.

9. The method in accordance with claim 6, each of the plurality of sub-portions being a virtual log file.

10. The method of claim 6, wherein the log marker data consists of two bits of each block.

* * * * *